United States Patent
Wang et al.

(10) Patent No.: US 11,884,287 B2
(45) Date of Patent: Jan. 30, 2024

(54) ENHANCED VEHICLE OPERATION

(71) Applicant: Ford Global Technologies, LLC, Dearborn, MI (US)

(72) Inventors: Yan Wang, Ann Arbor, MI (US); Kai Wu, Ann Arbor, MI (US); Dimitar Petrov Filev, Novi, MI (US); Brandon M. Dawson, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 185 days.

(21) Appl. No.: 17/406,469

(22) Filed: Aug. 19, 2021

(65) Prior Publication Data

US 2023/0058568 A1 Feb. 23, 2023

(51) Int. Cl.
*B60W 50/06* (2006.01)
*B60W 40/10* (2012.01)
*B60W 50/00* (2006.01)

(52) U.S. Cl.
CPC ............ *B60W 50/06* (2013.01); *B60W 40/10* (2013.01); *B60W 2050/0013* (2013.01); *B60W 2510/1015* (2013.01); *B60W 2520/00* (2013.01)

(58) Field of Classification Search
CPC ............... B60W 50/06; B60W 40/10; B60W 2050/0013; B60W 2510/1015; B60W 2520/00; B60W 30/188; B60W 2050/0031; B60W 2050/0088
See application file for complete search history.

(56) References Cited

U.S. PATENT DOCUMENTS

| 7,177,743 | B2 | 2/2007 | Roy |
| 10,974,716 | B2 | 4/2021 | Rothhamel |
| 2020/0142405 | A1* | 5/2020 | Havens ................ G05D 1/0212 |
| 2020/0193170 | A1* | 6/2020 | Braybrook .............. B60R 11/04 |
| 2020/0369284 | A1* | 11/2020 | Chen ................. B60W 50/0097 |
| 2021/0049501 | A1 | 2/2021 | Kalabic et al. |

FOREIGN PATENT DOCUMENTS

| CN | 106990714 | A | | 7/2017 | |
| CN | 109849895 | B | | 11/2020 | |
| CN | 112257182 | A | * | 1/2021 | ............. G06F 30/15 |
| CN | 111580494 | B | * | 6/2021 | ......... G05B 23/0243 |
| CN | 112874537 | A | * | 6/2021 | ............ B60W 40/08 |
| WO | WO-2019047509 | A1 | * | 3/2019 | ............. B62J 99/00 |

OTHER PUBLICATIONS

Translation of WO 2019047509 A1.*
Translation of CN 112257182 A.*
Translation of CN 112874537 A.*
Translation of CN 111580494 B.*
Han et al., "Behavior Planning For Connected Autonomous Vehicles Using Feedback Deep Reinforcement Learning", arXiv:2003.04371v2 [cs.AI] Oct. 1, 2020.

* cited by examiner

*Primary Examiner* — James M McPherson
*Assistant Examiner* — Kyle J Kingsland
(74) *Attorney, Agent, or Firm* — Brandon Hicks; Bejin Bieneman PLC

(57) ABSTRACT

Operation data from one or more vehicle subsystems are input to a vehicle dynamics model. Predicted operation data of the one or more vehicle subsystems are output from the vehicle dynamics model. The operation data and the predicted operation data are input to an optimization program that is programmed to output control directives for the one or more vehicle subsystems. One or more vehicle subsystems are operated according to the output control directives.

19 Claims, 5 Drawing Sheets

ENHANCED VEHICLE OPERATION

BACKGROUND

Vehicles can be equipped with computing devices, networks, sensors and controllers to acquire data regarding the vehicle's environment and to operate the vehicle based on the data. Operation of the vehicle can rely upon acquiring accurate and timely data regarding vehicle subsystem operation while the vehicle is being operated on a roadway.

DETAILED DESCRIPTION

Figure 1:
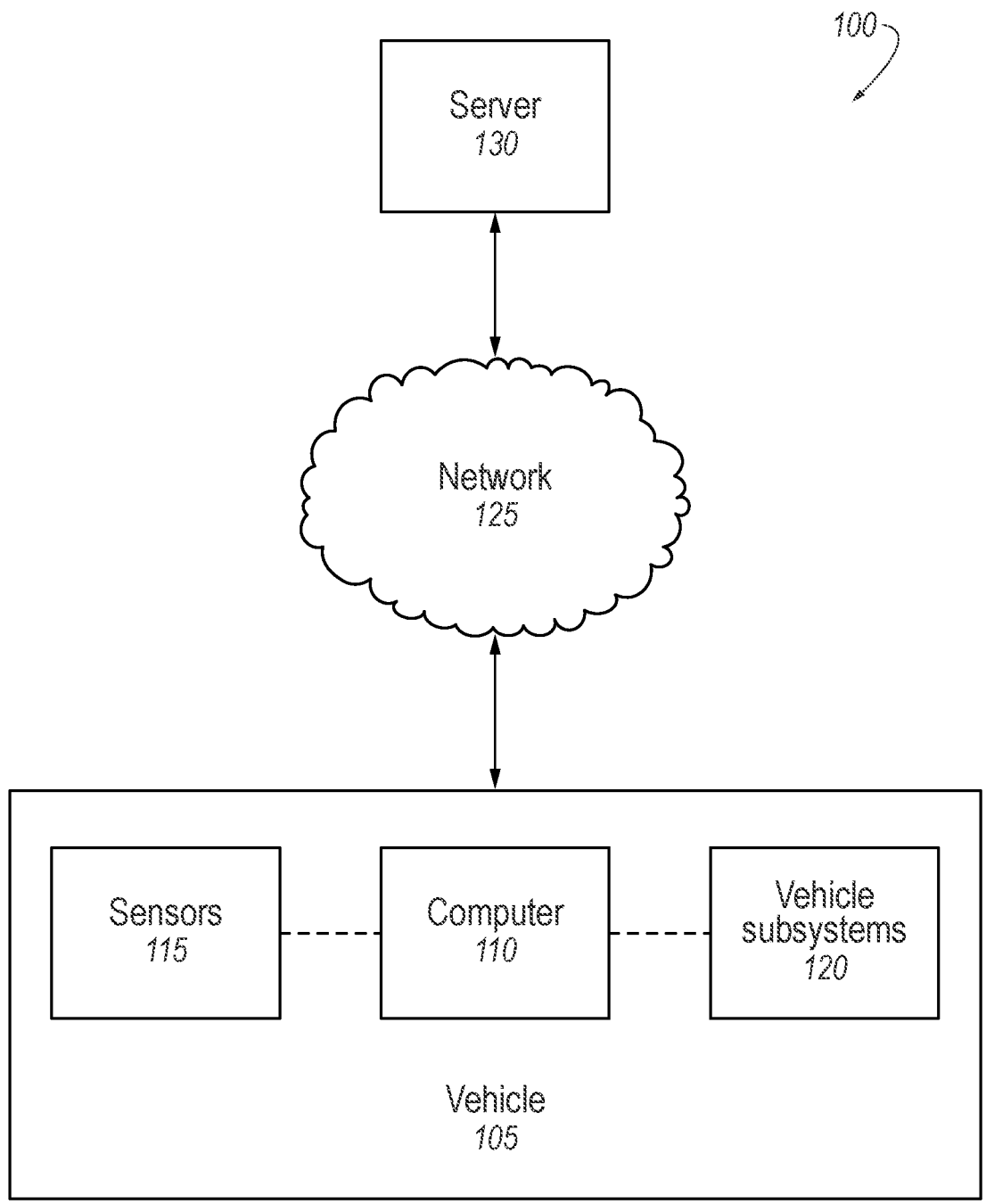
FIG. 1 is a block diagram of an example system for operating a vehicle.

A system includes a computer including a processor and a memory, the memory storing instructions executable by the processor to input operation data from one or more vehicle subsystems to a vehicle dynamics model, wherein the vehicle dynamics model is trained to model nonlinear vehicle dynamics in the operation data to output predicted operation data of the one or more vehicle subsystems, output predicted operation data of the one or more vehicle subsystems from the vehicle dynamics model, input the operation data from the one or more vehicle subsystems and the predicted operation data output from the vehicle dynamics model that models the nonlinear vehicle dynamics to an optimization program that is programmed to output control directives for the one or more vehicle subsystems, and operate the one or more vehicle subsystems according to the output control directives.

The instructions can further include instructions to update default control directives of the one or more vehicle subsystems based on the output control directives.

The optimization program can be programmed to output the control directives to attain the predicted operation data of the one or more vehicle subsystems.

The optimization program can be a multiple-input multiple-output control program.

The instructions can further include instructions to collect second operation data from the one or more vehicle subsystems operated according to the output control directives and to input the second operation data to the vehicle dynamics model.

The instructions can further include instructions to transmit the operation data to an external server programmed with the vehicle dynamics model and the optimization program.

The output control directives can include commands to actuate the one or more vehicle subsystems to attain a predicted operation value included in the predicted operation data.

The predicted operation value can be a propulsion torque and the output control directives can include commands to actuate a variable camshaft to a specified camshaft angle.

The vehicle dynamics model can include a clustering program that assigns the operation data to one of a plurality of clusters, wherein respective clusters can be configured to output at least some of the predicted operation data of the one or more vehicle subsystems.

The instructions can further include instructions to determine respective distances between the operation data and centers of respective clusters, and to generate a new cluster for the operation data when the respective distances exceeds a distance threshold.

The instructions can further include instructions to transmit control directives to a controller of one of the one or more vehicle subsystems, the controller can be programmed to actuate the vehicle subsystem according to the control directives, to collect the operation data of the vehicle subsystem, and to transmit the collected operation data to the computer.

The vehicle dynamics model can be a state space model of two or more vehicle parameters.

A method includes inputting operation data from one or more vehicle subsystems to a vehicle dynamics model, wherein the vehicle dynamics model is trained to model nonlinear vehicle dynamics in the operation data to output predicted operation data of the one or more vehicle subsystems, outputting predicted operation data of the one or more vehicle subsystems from the vehicle dynamics model, inputting the operation data from the one or more vehicle subsystems and the predicted operation data output from the vehicle dynamics model that models the nonlinear vehicle dynamics to an optimization program that is programmed to output control directives for the one or more vehicle subsystems, and operating the one or more vehicle subsystems according to the output control directives.

The method can further include updating default control directives of the one or more vehicle subsystems based on the output control directives.

The method can further include collecting second operation data from the one or more vehicle subsystems operated according to the output control directives and inputting the second operation data to the vehicle dynamics model.

The method can further include transmitting the operation data to an external server programmed with the vehicle dynamics model and the optimization program.

The method can further include determining respective distances between the operation data and centers of respective clusters and generating a new cluster for the operation data when the respective distances exceed a distance threshold.

The method can further include transmitting control directives to a controller of one of the one or more vehicle subsystems, the controller can be programmed to actuate the vehicle subsystem according to the control directives, to collect the operation data of the vehicle subsystem, and to transmit the collected operation data to the computer.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Vehicle subsystems can be calibrated according to specified driving scenarios, such as certification drive cycles. These driving scenarios allow manufacturers to generate control directives for the vehicle to control the subsystems. However, the driving scenarios may not capture specific driving styles or particular features of driving environments that differ from the specified driving scenarios.

Using a vehicle dynamics model and machine learning optimization program with operation data provides the vehicle with control directives tailored to the specific driving trends of the vehicle. The optimization program can use operation data and predicted operation values from the vehicle dynamics model to generate a set of control directives that improve operation of the vehicle for the specific driving environments that the vehicle experiences. By implementing the dynamics model and the optimization program in an external server, a plurality of vehicles can provide operation data to the optimization program, which in turn provides tailored control directives to respective vehicle. Thus, operation of respective vehicle can be individually tuned and improved based on the respective vehicle's specific operation and environment.

FIG. 1 is a block diagram of an example system 100 for operating a vehicle 105. The vehicle 105 includes a computer 110. The vehicle 105 may be any suitable type of ground vehicle 105, e.g., a passenger or commercial automobile such as a sedan, a coupe, a truck, a sport utility, a crossover, a van, a minivan, a taxi, a bus, etc.

Vehicles 105, such as autonomous or semi-autonomous vehicles 105, typically include a variety of sensors 115. A sensor is a device that can obtain one or more measurements of one or more physical phenomena. Some sensors 115 detect internal states of the vehicle 105, for example, wheel speed, wheel orientation, and engine and transmission variables. Some sensors 115 detect the position or orientation of the vehicle 105, for example, global positioning system GPS sensors 115; accelerometers such as piezo-electric or micro-electromechanical systems MEMS; gyroscopes such as rate, ring laser, or fiber-optic gyroscopes; inertial measurements units IMU; and magnetometers. Some sensors 115 detect the external world, for example, radar sensors 115, scanning laser range finders, light detection and ranging LIDAR devices, and image processing sensors 115 such as cameras. A LIDAR device detects distances to objects by emitting laser pulses and measuring the time of flight for the pulse to travel to the object and back. Some sensors 115 are communications devices, for example, vehicle-to-infrastructure V2I or vehicle-to-vehicle V2V devices. Sensor operation can be affected by obstructions, e.g., dust, snow, insects, etc. Often, but not necessarily, a sensor includes a digital-to-analog converter to converted sensed analog data to a digital signal that can be provided to a digital computer 110, e.g., via a network. Sensors 115 can include a variety of devices, and can be disposed to sense and environment, provide data about a machine, etc., in a variety of ways. For example, a sensor could be mounted to a stationary infrastructure element on, over, or near a road. Moreover, various controllers in a vehicle 105 may operate as sensors 115 to provide data via the vehicle 105 network or bus, e.g., data relating to vehicle 105 speed, acceleration, location, subsystem and/or component status, etc. Further, other sensors 115, in or on a vehicle 105, stationary infrastructure element, etc., infrastructure could include cameras, short range radar, long range radar, LIDAR, and/or ultrasonic transducers, weight sensors 115, accelerometers, motion detectors, etc., i.e., sensors 115 to provide a variety of data. To provide just a few non-limiting examples, sensor data could include data for determining a position of a component, a location of an object, a speed of an object, a type of an object, a slope of a roadway 200, a temperature, a presence or amount of moisture, a fuel level, a data rate, etc.

A vehicle subsystem 120 is a set of components or parts, including hardware components and typically also software and/or programming, to perform a function or set of operations in the vehicle 105. Vehicle subsystems 120 typically include, without limitation, a braking system, a propulsion system, and a steering system. The propulsion subsystem converts energy to rotation of vehicle wheels to propel the vehicle 105 forward and/or backward. The braking subsystem can slow and/or stop vehicle movement. The steering subsystem can control a yaw, e.g., turning left and right, maintaining a straight path, of the vehicle 105 as it moves.

A vehicle network is a network via which messages can be exchanged between various devices in vehicle 105. Computer 110 can be generally programmed to send and/or receive, via vehicle 105 network, messages to and/or from other devices in vehicle 105 e.g., any or all of ECUs, sensors 115, actuators, components, communications module, a human machine interface HMI, etc. Additionally or alternatively, messages can be exchanged among various such other devices in vehicle 105 via vehicle 105 network. In cases in which computer 110 actually comprises a plurality of devices, vehicle 105 network may be used for communications between devices represented as computer 110 in this disclosure. Further, as mentioned below, various controllers and/or vehicle 105 sensors 115 may provide data to the computer 110. In some implementations, vehicle 105 network can be a network in which messages are conveyed via a vehicle 105 communications bus. For example, vehicle 105 network can include a controller area network CAN in which messages are conveyed via a CAN bus, or a local interconnect network LIN in which messages are conveyed via a LIN bus. In some implementations, vehicle 105 network can include a network in which messages are conveyed using other wired communication technologies and/or wireless communication technologies e.g., Ethernet, WiFi, Bluetooth, etc. Additional examples of protocols that may be used for communications over vehicle 105 network in some implementations include, without limitation, Media Oriented System Transport MOST, Time-Triggered Protocol TTP, and FlexRay. In some implementations, vehicle network can represent a combination of multiple networks, possibly of different types, that support communications among devices in vehicle 105. For example, vehicle network can include a CAN in which some devices in the vehicle 105 communicate via a CAN bus, and a wired or wireless local area network in which some device in vehicle 105 communicate according to Ethernet or Wi-Fi communication protocols.

A computer 110 can be programmed to communicate with one or more remote sites such as a server 130, via a wide area network 125. The wide area network 125 can include one or more mechanisms by which a vehicle computer 110 may communicate with, for example, a remote server 130. Accordingly, the network can include one or more of various wired or wireless communication mechanisms, including any desired combination of wired e.g., cable and fiber and/or wireless e.g., cellular, wireless, satellite, microwave, and radio frequency communication mechanisms and any desired network topology or topologies when multiple communication mechanisms are utilized. Exemplary communication networks include wireless communication networks e.g., using Bluetooth, Bluetooth Low Energy BLE, IEEE 802.11, vehicle-to-vehicle V2V or vehicle 105 to everything V2X such as cellular V2X CV2X, Dedicated Short Range Communications DSRC, etc., local area networks LAN and/or wide area networks 125 WAN, including the Internet, providing data communication services.

Figure 2:
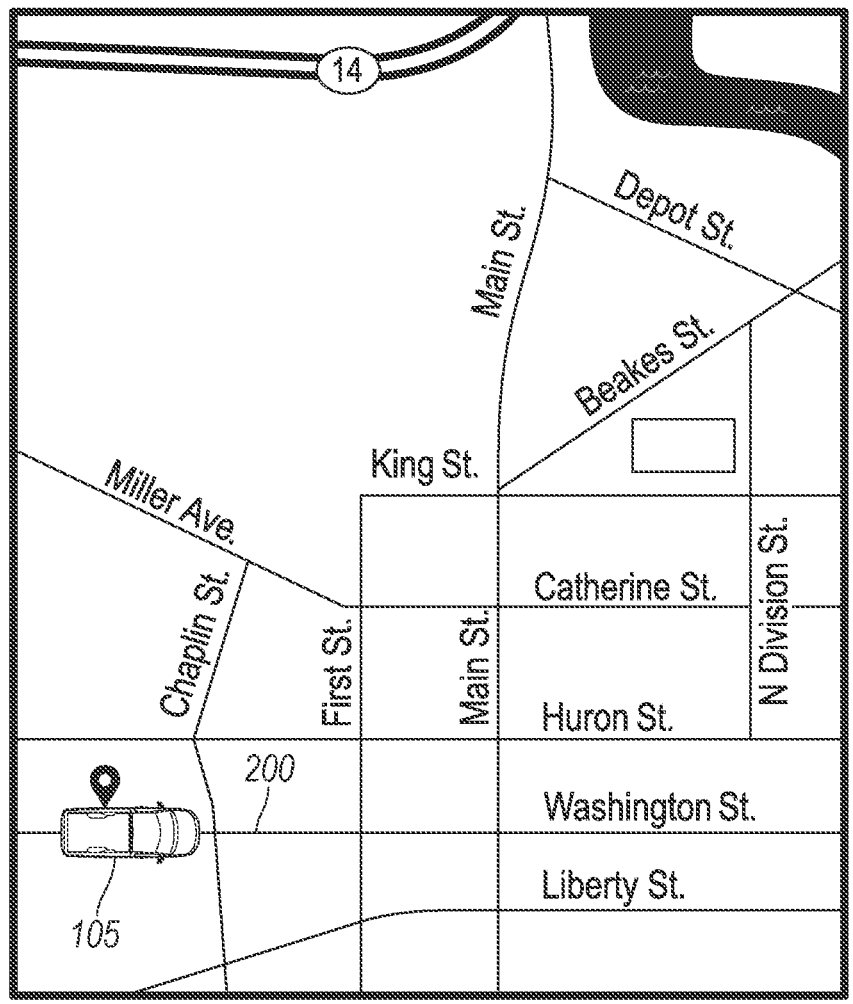
FIG. 2 is a view of the vehicle on a roadway.

FIG. 2 is a view of a vehicle 105 operating on a roadway 200. The computer 110 actuates one or more subsystems 120 to move the vehicle 105 along the roadway 200, e.g., along a planned route. The computer 110 can actuate one or more subsystems 120 according to a "control directive." The "control directive" is a set of one or more commands that the computer 110 follows to operate one or more of the subsystems 120 to attain a specified operation value, i.e., a specified output from the subsystems. For example, the subsystem 120 can be a propulsion, and the operation value can be a specified torque output from the propulsion, and the control directive can be a set of commands to operate the propulsion to output the specified torque, e.g., a text file including commands such as:

1. Specified Torque Output: $\tau$
2. Specified Fuel Consumption: x
3. Compare Measured Values to Specified Values
4. Adjust Camshaft Angle $\theta$ by Incremental Step $\theta'$ until Specified Values Met The computer 110 can store a plurality of control directives to operate the subsystems 120 to target operation values.

The computer 110 can collect operation data of the subsystems 120. The "operation data" are data from the subsystems 120 describing or measuring outputs of the subsystems 120. The operation data can include, e.g., engine torque, engine speed, steering motor angles, etc. The computer 110 can collect the operation data from a vehicle 105 network, e.g., a CAN bus, and/or from one or more sensors 115.

Figure 3:
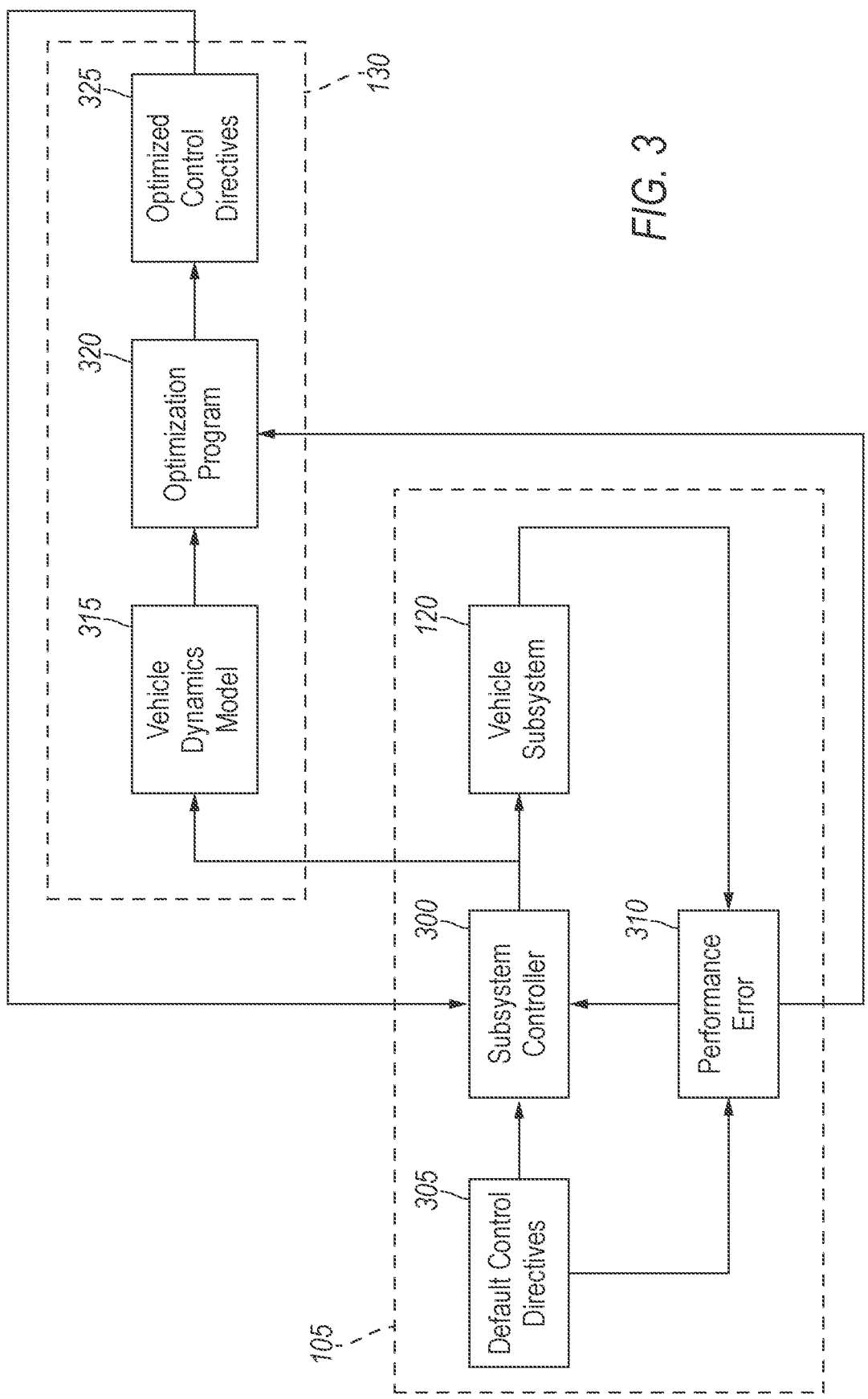
FIG. 3 is a block diagram of a computer of the vehicle and an external server.

FIG. 3 is a block diagram of the server 130 and the computer 110 determining control directives to operate subsystems 120 of the vehicle 105. The computer 110 can collect operation data from the subsystems 120, transmit the data to the server 130, and the server 130 can generate control directives based on the data.

The vehicle 105 includes one or more subsystem controllers 300. The subsystem controller 300 operates one of the subsystems 120 according to one of the control directives and collect operation data about operation of the subsystem 120. As described above, the subsystem controller 300 can operate the subsystem 120 to attain a predicted operation value. For example, the subsystem controller 300 for the propulsion can operate a variable camshaft to a specified camshaft angle to output a specified torque. The server 130 can transmit the control directives to the computer 110, and the computer 110 can transmit a specified control directive to respective subsystem controller 300. Then, the subsystem controllers 300 can collect operation data from respective subsystem 120 operated according to the control directives.

The computer 110 can store a plurality of default control directives 305 for the subsystems 120. The "default" control directives are control directives programmed by a manufacturer and stored in a memory of the computer 110. The default control directives 305 provide commands that the subsystem controller 300 follows to operate the subsystem 120. As described below, the server 130 can provide updated control directives for one or more of the subsystems 120, i.e., new control directives to replace the default control directives 305.

The computer 110 can identify a performance error 310 of the subsystem 120. A "performance error" is operating data that differ from predicted operation of the subsystem 120 when following the default control directives 305. That is, the default control directives 305 provide commands to the subsystem controller 300 to operate the subsystem 120 to a specified operation value. However, based on external factors such as road condition, vehicle 105 load, etc., the measured output values of the subsystem 120 may differ from the specified operation values. The computer 110 can determine a difference between the operation values determined during operation of the subsystem 120 and the specified operation values to which the default control directives 305 are defined, and the computer 110 can transmit the difference to the server 130, as described below, to generate new control directives that account for the real-world operation of the vehicle 105.

The server 130 can input default control directives 305 and operation data received from the vehicle 105 to a vehicle dynamics model 315 to predict vehicle operation data. The "vehicle dynamics model" is a program trained to model nonlinear behavior of the vehicle 105 and output predicted operation data of one or more vehicle subsystems 120. That is, vehicle behavior may be nonlinear for specified changes to operation of the subsystems 120, and the vehicle dynamics model 315 can account for the nonlinearity of the subsystem operation, outputting predicted operation values to control the subsystem 120.

The vehicle dynamics model 315 can be a linearized model, such as an Auto-Regressive Moving Average (ARMA) model. An ARMA model generates a set of linear equations that can be regularized to identify unknown parameters, producing outputs that account for the nonlinearities of vehicle dynamics. The inputs to the ARMA model can be parameters of a subsystem 120, and the output of the ARMA model can be one or more operation values. For example, when the subsystem 120 is an internal combustion engine, the inputs to a vehicle dynamics model can include, e.g., throttle position in degrees, spark timing in degrees, injection timing in degrees, fuel pulse width, exhaust camshaft position in degrees, and/or intake camshaft position in degrees, and the outputs can include, e.g., total fuel consumption and/or total output torque. An example ARMA model is shown in the Expression below:

$$y(k)=a_1 y(k-1)+a_2 y(k-2)+b_1^T u(k-1)+b_2^T u(k-2) \quad (1)$$

where $a_1$, $a_2$, $b_1$, $b_2$ are solvable coefficients that describe the output predicted operation values y, k is an integer index, T is the matrix transpose function, as is known, and u(k) is input operation data. That is, to predict operation of the subsystem 120, solving the ARMA model for the coefficients $a_1$, $a_2$, $b_1$, $b_2$ generates one or more output functions y that each describes a specified output value. In an example when the subsystem 120 is an internal combustion engine, the input operation data u can be a matrix with six types of operation data: throttle position, spark timing, injection timing, fuel pulse width, exhaust camshaft position, and intake camshaft position, and the output value functions y can include two outputs: total fuel consumed by the internal combustion engine and total torque output from the internal combustion engine.

The server 130 can solve the ARMA model by minimizing a cost function J:

$$J=\|H\theta-y(k)\|+\mu\|F\theta\| \quad (2)$$

$$H=[y(k-1),y(k-2),u(k-1)^T,u(k-2)^T] \quad (3)$$

$$\theta=[a_1,a_2,b_1,b_2] \quad (4)$$

where $\theta$ are the coefficients to solve for to generate the output equations y, H is a set of previous operation data u and predicted operation value y, $\mu$ is a mean of the previous operation data u, and F is a diagonal matrix with weights for each coefficient in $\theta$. The weight matrix F is a predetermined set of weights determined by the manufacturer.

The server 130 can minimize the cost function J according to a conventional algorithmic solver. For example, the server 130 can calculate an exact analytical solution $\theta^*$:

$$\theta^* = (\mu FF^T + H^T H)^{-1} H^T y(k) \quad (5)$$

Alternatively, the server 130 can use a recursive least square algorithm to determine an approximate solution $\hat{\theta}$:

$$P(k)=P(k-1)-P(k-1)r(k)(1+r(k)^T P(k-1)r(k))^{-1} r(k)^T P(k-1) \quad (6)$$

$$\hat{\theta}(k)=\hat{\theta}(k-1)+P(k)r(k)(1+r(k)^T P(k-1)r(k))^{-1}(y(k)-r(k)^T \hat{\theta}(k-1)) \quad (7)$$

$$r(k)=(y(k-1),y(k-2),u(k-1),u(k-2))^T \quad (8)$$

where P(k) is a covariance matrix defined by the Expression above and r(k) is a regressor factor defined by the Expression above. The server 130 can determine whether to compute the analytical solution θ* or the approximate solution $\hat{\theta}$ based on, e.g., computational resources required to perform the calculations.

Alternatively, the vehicle dynamics model 315 can include a clustering program. A "clustering program" is a program that assigns the operation data to one of a plurality of clusters. Respective "clusters" are configured to output at least some of the predicted operation data of the one or more vehicle subsystems 120. That is, the clusters represent localized models of subsystem operation, and a distance of a particular operation value to the clusters can be an indication of likely the subsystem 120 that generated the operation value is operating according to the model of subsystem operation represented by the clusters.

An example clustering program is a spatial temporal filter (STF) program. The STF program determines respective distances between the operation data and centers of respective clusters, assigning the operation data to one of the clusters based on the distance or generating a new cluster for the operation data when the respective distances exceed a distance threshold. That is, the STF program can identify regions in multidimensional input-output space defined by the operation data u and output operation values y to define respective clusters, such as those described above for the ARMA model. The server 130 can determine a Mahalanobis distance, as is known, between respective (u, y) points and assign clusters to those points that are within a predetermined distance threshold of each other. As additional operation data u are input to the STF program, the server 130 updates the cluster determinations and respective centroids of respective clusters by determining new Mahalanobis distances and then generating the clusters according to those distances. The centroids of the clusters, which can be determined by a conventional geometric centroid determining algorithm, are respective predicted output operation values for some operation value y. Thus, the server 130 can output predicted operation values based on the clusters determined by the STF program.

As another example, the vehicle dynamics model 315 may be a state space model. The "state space" model transforms linear equations (such as those from the ARMA model described above) according to a transformation function to define recursive state equations that describe operation of the subsystem 210. The state equations can be solved using a conventional technique, e.g., recursive least squares, to generate values that an optimization program, as described below, can use to generate control directives. For example, the transformation function can be a discrete time transfer function in a transform variable z:

$$\frac{y(z)}{u(z)} = \frac{z^{-1} b_1^T + z^{-2} b_2^T}{1 - a_1 z^{-1} - a_2 z^{-2}} \quad (9)$$

$$q(z) = \frac{u(z)}{1 - a_1 z^{-1} - a_2 z^{-2}} \quad (10)$$

where q(z) can be transformed back into k variables to describe operation data u(k) and states $x_1$, $x_2$ for the state space model $$u(k)=q(k)-a_1 q(k-1)-a_2 q(k-2) \quad (11)$$

$$x_1(k)=q(k-2) \quad (12)$$

$$x_2(k)=q(k-1) \quad (13)$$

The server 130 can then generate a compact state space model based on the states $x_1$, $x_2$:

$$x(k+1) = Ax(k) + Bu(k) \quad (14)$$

$$y(k) = Cx(k) \quad (15)$$

$$x(k) = [\, x_1(k) \quad x_2(k)\,] \quad (16)$$

$$A = \begin{bmatrix} 0 & I \\ a_2 I & a_1 I \end{bmatrix} \quad (17)$$

$$B = \begin{bmatrix} 0 \\ I \end{bmatrix} \quad (18)$$

$$C = [\, b_2^T \quad b_1^T \,] \quad (19)$$

where I is the identity matrix. Thus, by solving the state space model with a conventional solver (e.g., a least squares algorithm), the server 130 can predict output values y(k) based on input operation data u(k).

The server 130 can include an optimization program 320. An "optimization program" is a program trained to output control directives for one or more vehicle subsystems 120 based on input operation data and predicted vehicle dynamics. That is, the optimization program 320 outputs control directives to attain predicted operation data output from the vehicle dynamics model 315. The optimization program 320 can be a conventional multiple-input multiple-output (MIMO) program, e.g., a Model Predictive Control (MPC) program. The server 130 can minimize an optimization function $f$ based on output from the vehicle dynamics model 315:

$$f = \sum_k \left( w_1 (y_1(k) - y_{1,ref}(k))^2 + w_2 y_2^2(k) + w_3 \|u(k-1)\|^2 \right) \quad (20)$$

$$\text{subject to } u_{min} \leq u(k) \leq u_{max} \quad (21)$$

$$u(k)_{base} - u_l(k) \leq u(k) \leq u(k)_{base} - u_h(k) \quad (22)$$

$$x(k+1) = Ax(k) + Bu(k)$$

$$y(k) = Cx(k)$$

where $w_1$, $w_2$, $w_3$ are adaptable weight values, $y_1$, $y_2$ are output operation values (here representing the two predicted operation values for y described above), $y_{1,ref}$ is a reference output used to determine the performance error 310 described above, $u_{min}$, $u_{max}$ are minimum and maximum potential values, respectively, for input operation data u, $u(k)_{base}$ is a baseline value for the operation data stored in a memory of the server 130, and $u_l$, $u_h$ are lower and upper bounds, respectively, within which the optimization program 320 seeks to constrain the operation data u.

Figure 5:
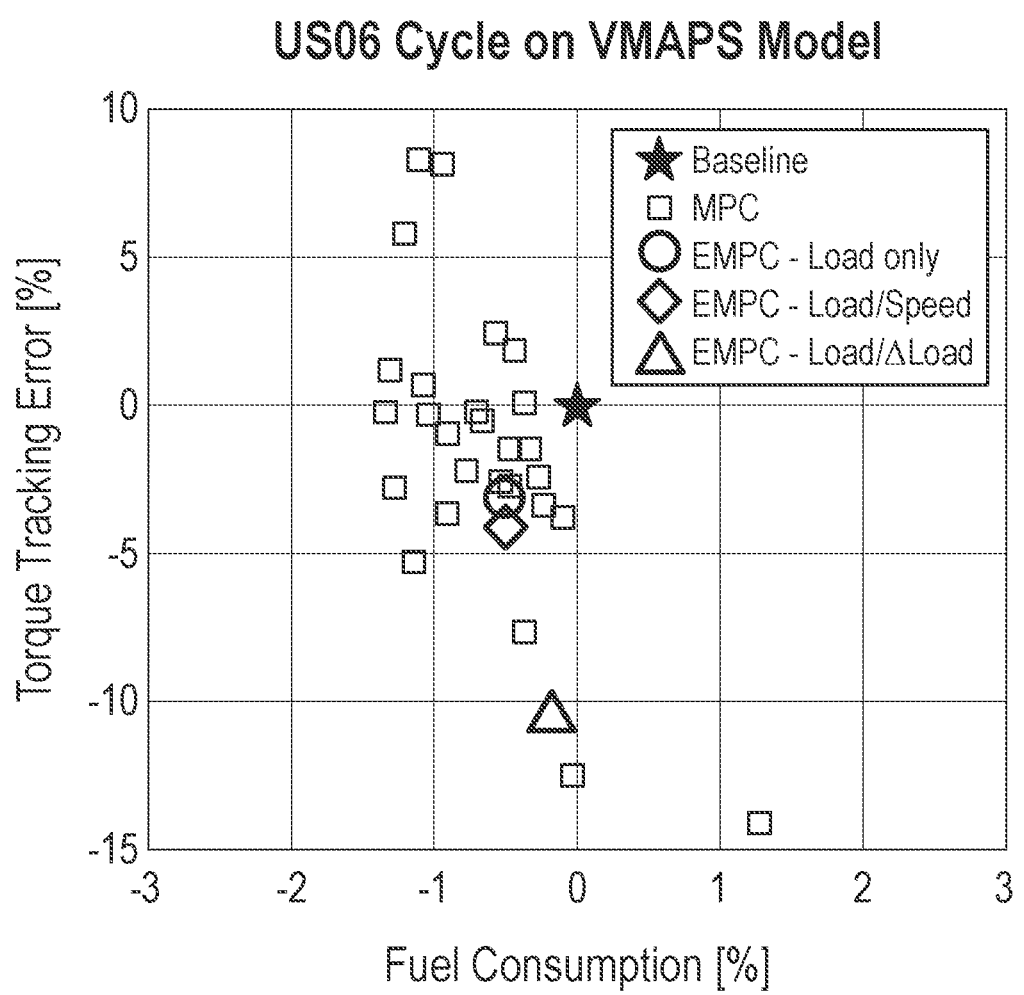
FIG. 5 is a diagram of a graph of an optimization program and target operation values.

Upon minimizing the optimization function $f$, the optimization program 320 can determine optimized control directives 325 for the subsystems 120. The minimized optimization function $f$ generates values for the output operation values $y_1$, $y_2$ to which the subsystem controllers 300 should operate the subsystems 120. The optimization program 320 then generates a set of commands for respective subsystems 120 to attain the operation values $y_1$, $y_2$. These sets of commands, collectively, are the optimized control directives 325. The optimization program 320 can generate the optimized control directives 325 according to a known protocol, e.g., MPC. For example, the optimization program 320 can determine a specified torque output at which fuel consumption is minimized, and the optimization program 320 can output control commands to actuate the internal combustion engine at specified throttle positions, spark timings, injection timings, fuel pulse widths, exhaust camshaft positions, and intake camshaft positions to attain the specified torque output and fuel consumption. As shown in FIG. 5, discussed further below, the optimized control directives 325 can reduce fuel consumption and torque output error compared to the default control directives 305.

Upon outputting the optimized control directives 325, the server 130 can transmit the optimized control directives 325 to the computer 110 of the vehicle 105. The computer 110 can instruct the subsystem controllers 300 to operate the subsystems 210 according to the optimized control directives 325. The subsystem controllers 300 can then collect second operation data from one or more vehicle subsystems 120 operated according to the optimized control directives 325 and can transmit the second operation data to the server 130. The server 130 can input the second operation data to the vehicle dynamics model 315 and to the optimization program 320, generating a second set of optimized control directives 325. Thus, the computer 110 and the server 130 can periodically update the control directives with additional real-world operation data, refining the control directives used by the subsystem controllers 300.

Figure 4:
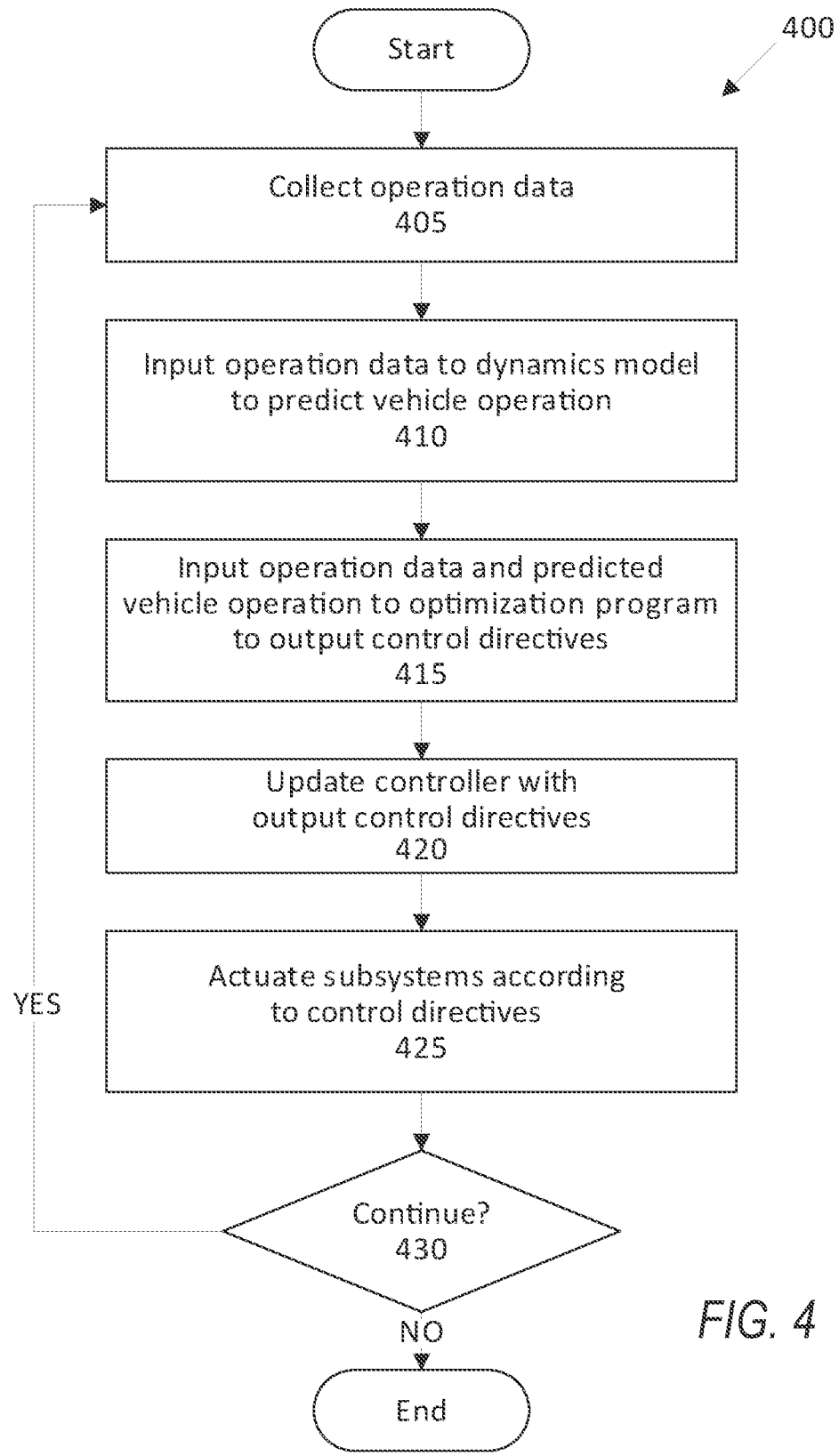
FIG. 4 is a block diagram of an example process for operating the vehicle.

FIG. 4 is a block diagram of an example process 400 for operating a vehicle 105 on a roadway 200. The process 400 begins in a block 405, in which a computer 110 instructs a subsystem controller 300 of a vehicle subsystem 120 measures operation data about the subsystem 120. As described above, the operation data are data describing operation of the subsystem 120. For example, when the subsystem 120 is a propulsion, the operation data can include, e.g., throttle position, spark timing, injection timing, fuel pulse width, exhaust camshaft position, and/or intake camshaft position.

Next, in a block 410, a server 130 inputs operation data sent from the computer 110 to a dynamics model 315 that models nonlinear vehicle dynamics and outputs predicted operation values of the subsystems 120. As described above, the dynamics model 315 can be a model that linearizes the nonlinear relationships between operation data and outputs from the subsystem 120. For example, the dynamics model 315 can be an ARMA model, a clustering program, a state space model, etc.

Next, in a block 415, the server 130 inputs the operation data and the predicted operation values output from the dynamics model 315 to an optimization program 320. The optimization program 320 generates a set of optimized control directives 325 for operating the subsystems 120. For example, the optimization program 320 can be an MPC program.

Next, in a block 420, the server 130 transmits the optimized control directives 325 to the computer 110, and the computer 110 updates the subsystem controllers 300 with the optimized control directives 325. That is, the subsystem controllers 300 can operate the subsystems 120 according to the optimized control directives 325 instead of default control directives programmed by a manufacturer.

Next, in a block 425, the computer 110 instructs the subsystem controllers 300 to actuate the subsystems 120 according to the optimized control directives 325. As described above, the subsystem controllers 300 can actuate the subsystems 120 according to the commands generated by the optimization program 320 to attain optimized output control values.

Next, in a block 430, the computer 110 determines whether to continue the process 400. The computer 110 can determine to continue when the vehicle 105 is in motion on the roadway 200. If the computer 110 determines to continue, the process 400 returns to the block 405. Otherwise, the process 400 ends.

FIG. 5 is a diagram 500 showing results of a vehicle simulation model operating according to default control directives 305 and optimized control directives 325 output from the optimization program 320. The vehicle simulation model in FIG. 5 is a conventional VMAPS (Vehicle Model Architecture for Powertrain Systems) simulation package that models operation of a powertrain of a vehicle. The VMAPS model can simulate a driving "cycle," i.e., a predetermined set of vehicle operation that can be simulated in a simulation model to predict operation of a real-world vehicle 105. The diagram 500 shows a US06 Supplemental Federal Test Procedure (SFTP) cycle simulated in the VMAPS model according to the default control directives 305 and optimized control directives 325. The horizontal axis charts changes to fuel consumption in percent relative to a "baseline" model, i.e., the simulation run according to the default control directives 305. The vertical axis charts changes to torque tracking error in percent relative to the baseline model. The "torque tracking error" is the performance error 310 of the simulated torque output relative to the specified torque in the control directives 305, 325. The diagram is normalized such that the baseline model, represented by the star symbol, is at the coordinates (0,0), and the outputs from the optimized control directives 325 are plots relative to that baseline model output. Thus, the diagram 500 illustrates the performance of the optimized control directives 325 in the vehicle simulation model relative to the performance of the default control directives 305.

The diagram 500 shows outputs from a conventional Model Predictive Control (MPC) program that generates optimized control directives 325 as square symbols. The MPC program outputs listed in FIG. 5 do not include data from the vehicle dynamics model 315 and represents a conventional optimization program 320. The diagram 500 shows that the outputs from the MPC program typically have lower fuel consumption, clustering at about 0 to −1% relative to the baseline output, but are scattered between −5 to 10% torque tracking error. That is, the MPC program examples shown in FIG. 5 illustrate better fuel consumption relative to the baseline model but are inconclusive on torque tracking error.

The diagram 500 shows outputs from the optimization program 320 described above that incorporates data from the vehicle dynamics model 315, shown in the diagram 500 as an Enhanced MPC (EMPC) program with a circle, diamond, and triangle symbol. The EMPC program incorporates data from the vehicle dynamics model 315, e.g., road force load data (represented by the circle symbol), load and speed data (represented by the diamond symbol), and load and change in load data (represented by the triangle symbol). For example, the ARMA model described above provides predicted outputs for a predicted load and a predicted speed, and the optimization program 320 outputs optimized control directives 325 that, when used to run the VMAPS model according to the US06 driving cycle, output a fuel consumption and torque tracking error mapped with the diamond symbol in the diagram 500. The outputs from the optimized control directives 325 all map in the lower left quadrant of the diagram 500, indicating that the outputs have less fuel consumption relative to the baseline model and lower torque tracking error relative to the baseline model. That is, the optimized control directives 325 output from the optimization program 320 described above and shown in FIG. 3 reduce simulated fuel consumption and reduce simulated torque tracking error, improving simulated operation of the vehicle 105 on the US06 driving cycle.

Computer-executable instructions may be compiled or interpreted from computer 110 programs created using a variety of programming languages and/or technologies, including, without limitation, and either alone or in combination, Java, C, C, Visual Basic, Java Script, Perl, HTML, etc. In general, a processor e.g., a microprocessor receives instructions, e.g., from a memory, a computer 110 readable medium, etc., and executes these instructions, thereby performing one or more processes, including one or more of the processes described herein. Such instructions and other data may be stored and transmitted using a variety of computer-readable media. A file in a networked device is generally a collection of data stored on a computer-readable medium, such as a storage medium, a random access memory, etc. A computer-readable medium includes any medium that participates in providing data e.g., instructions, which may be read by a computer 110. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer 110. Common forms of computer-readable media include, for example, RAM, a PROM, an EPROM, a FLASH-EEPROM, any other memory chip or cartridge, or any other medium from which a computer 110 can read.

Use of in response to, based on, and upon determining herein indicates a causal relationship, not merely a temporal relationship.

The adjectives first and second are used throughout this document as identifiers and, unless explicitly stated otherwise, are not intended to signify importance, order, or quantity.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A system, comprising a computer including a processor and a memory, the memory storing instructions executable by the processor to:
input operation data from one or more vehicle subsystems to a vehicle dynamics model, wherein the vehicle dynamics model is trained to model nonlinear vehicle dynamics in the operation data to output predicted operation data of the one or more vehicle subsystems;
output predicted operation data of the one or more vehicle subsystems from the vehicle dynamics model;
input the operation data from the one or more vehicle subsystems and the predicted operation data output from the vehicle dynamics model that models the nonlinear vehicle dynamics to an optimization program that is programmed to output control directives for the one or more vehicle subsystems; and
operate the one or more vehicle subsystems according to the output control directives;
wherein the vehicle dynamics model includes a clustering program that assigns the operation data to one of a plurality of clusters, wherein respective clusters represent localized models of operation of the one or more vehicle subsystems, and are configured to output at least some of the predicted operation data of the one or more vehicle subsystems.

2. The system of claim 1, wherein the instructions further include instructions to update default control directives of the one or more vehicle subsystems based on the output control directives.

3. The system of claim 1, wherein the optimization program is programmed to output the control directives to attain the predicted operation data of the one or more vehicle subsystems.

4. The system of claim 1, wherein the optimization program is a multiple-input multiple-output control program.

5. The system of claim 1, wherein the instructions further include instructions to collect second operation data from the one or more vehicle subsystems operated according to the output control directives and to input the second operation data to the vehicle dynamics model.

6. The system of claim 1, wherein the instructions further include instructions to transmit the operation data to an external server programmed with the vehicle dynamics model and the optimization program.

7. The system of claim 1, wherein the output control directives include commands to actuate the one or more vehicle subsystems to attain a predicted operation value included in the predicted operation data.

8. The system of claim 7, wherein the predicted operation value is a propulsion torque and the output control directives include commands to actuate a variable camshaft to a specified camshaft angle.

9. The system of claim 1, wherein the instructions further include instructions to determine respective distances between the operation data and centers of respective clusters, and to generate a new cluster for the operation data when the respective distances exceed a distance threshold.

10. The system of claim 1, wherein the instructions further include instructions to transmit control directives to a controller of one of the one or more vehicle subsystems, the controller programmed to actuate the vehicle subsystem according to the control directives, to collect the operation data of the vehicle subsystem, and to transmit the collected operation data to the computer.

11. The system of claim 1, wherein the vehicle dynamics model is a state space model of two or more vehicle parameters.

12. A method, comprising:
inputting operation data from one or more vehicle subsystems to a vehicle dynamics model, wherein the vehicle dynamics model is trained to model nonlinear vehicle dynamics in the operation data to output predicted operation data of the one or more vehicle subsystems;
outputting predicted operation data of the one or more vehicle subsystems from the vehicle dynamics model;
inputting the operation data from the one or more vehicle subsystems and the predicted operation data output from the vehicle dynamics model that models the nonlinear vehicle dynamics to an optimization program that is programmed to output control directives for the one or more vehicle subsystems; and
operating the one or more vehicle subsystems according to the output control directives;
wherein the vehicle dynamics model includes a clustering program that assigns the operation data to one of a plurality of clusters, wherein respective clusters represent localized models of operation of the one or more vehicle subsystems, and are configured to output at least some of the predicted operation data of the one or more vehicle subsystems.

13. The method of claim 12, further comprising updating default control directives of the one or more vehicle subsystems based on the output control directives.

14. The method of claim 12, wherein the optimization program is programmed to output the control directives to attain the predicted operation data of the one or more vehicle subsystems.

15. The method of claim 12, further comprising collecting second operation data from the one or more vehicle subsystems operated according to the output control directives and inputting the second operation data to the vehicle dynamics model.

16. The method of claim 12, further comprising transmitting the operation data to an external server programmed with the vehicle dynamics model and the optimization program.

17. The method of claim 12, wherein the output control directives include commands to actuate the one or more vehicle subsystems to attain a predicted operation value included in the predicted operation data.

18. The method of claim 12, further comprising transmitting control directives to a controller of one of the one or more vehicle subsystems, the controller programmed to actuate the vehicle subsystem according to the control directives, collecting the operation data of the vehicle subsystem, and transmitting the collected operation data to a computer.

19. The method of claim 12, further comprising determining respective distances between the operation data and centers of respective clusters, and to generate a new cluster for the operation data when the respective distances exceed a distance threshold.

* * * * *